United States Patent Office 2,983,741
Patented May 9, 1961

2,983,741
CYCLOPENTADIENYL TITANIUM HALIDES

John C. Brantley, Snyder, N.Y., assignor to Union Carbide Corporation, a corporation of New York No Drawing. Filed Sept. 23, 1953, Ser. No. 381,962

15 Claims. (Cl. 260—429.5)

This invention relates to organo-metallic compounds containing titanium as the metal component. The invention includes correlated improvements and discoveries whereby such titanium compounds having distinctive properties are obtained.

An object of the invention is to provide organo-metallic compounds containing titanium as the metallic component linked to the organic component by carbon to metal bonds.

A further object of the invention is to provide a method for producing such organo-titanium compounds.

Other objects of the invention will in part be obvious and will in part appear hereinafter.

The products of this invention have the general empirical formula:

$$R_2TiX_n$$

where R is a residue of an organic compound containing a five carbon ring, alicyclic in character, which is hereinafter designated an "alicyclic cyclopentadienyl carbon ring" and has the structure:

X is halogen and $n$ is 0, 1 or 2.

The alicyclic character of the carbon ring is essential for purposes of this invention. For example, both cyclopentadiene and indene contain an alicyclic cyclopentadienyl ring structure; cyclopentadiene having no double bond coordinately shared with an aromatic ring and indene having only one double bond of the cyclopentadienyl ring coordinately shared with an aromatic ring. In contrast, the five carbon ring in fluorene, where each of the double bonds in such ring is coordinately shared with an aromatic ring, is not alicyclic in character and fluorene thus does not contain an alicyclic cyclopentadienyl ring structure.

In the practice of this invention an organo-magnesium halide of an organic compound containing an alicyclic cyclopentadienyl carbon ring may be formed and then reacted with a titanium halide to produce the desired organo-metallic compound. The organo magnesium halide, hereinafter referred to as a "cyclopentadienyl carbon ring Grignard reagent" has the general formula RMgX wherein R and X are as described above. The organic compound containing the alicyclic cyclopentadienyl carbon ring which is to be reacted with a lower alkyl magnesium halide for production of the cyclopentadienyl carbon ring Grignard reagent should, before its combination in the Grignard reagent, contain a reactive hydrogen on the methylene carbon of the alicyclic cyclopentadienyl carbon ring, but the number and character of substituents on the cyclopentadienyl carbon ring may otherwise be varied at will. Suitable organic compounds include hydrocarbon compounds having the requisite alicyclic cyclopentadienyl carbon ring. Examples of such hydrocarbon compounds are cyclopentadiene, its aliphatic derivatives as for example methyl, ethyl and allyl cyclopentadiene, its aromatic derivatives as for example benzyl cyclopentadiene; also indene and its comparable derivatives.

The formation of a dihalide according to this invention may be illustrated by the reaction between cyclopentadienyl magnesium chloride and $TiCl_4$. The Grignard reagent may be prepared by reacting magnesium turnings with a lower alkyl chloride in a solvent, ethyl ether, benzene or the like for example, and reacting the resulting solution with cyclopentadiene. It is believed that the cyclopentadienyl carbon ring Grignard reagent reacts with titanium tetrahalide according to the following equation:

$$2RMgX + TiX_4 \rightarrow R_2TiX_2 + 2MgX_2$$

When the halide in the cyclopentadienyl carbon ring Grignard reagent is different from that in the titanium halide the reaction product may contain a mixture of dihalides or a mixture of dihalides and mixed dihalide and will have an apparent average empirical formula:

$$R_2TiX_{(y)}X'_{(z)}$$

where X and X' are different halogens and $y$ and $z$ are numbers which total 2, i.e. any such numbers between 0 and 2, depending on the proportions of the particular halogens present in combined state. By reaction with dilute aqueous HCl, $R_2TiCl_{(y)}Br_{(z)}$ may be converted into $R_2TiCl_2$. Also $R_2TiCl_{(y)}Br_{(z)}$ and $R_2TiCl_2$ may be converted to $R_2TiF_2$ by recrystallization from dilute hydrofluoric acid, through halide exchange.

The reaction of the cyclopentadienyl carbon ring Grignard reagent with titanium halide is preferably initially conducted at temperatures between about 0° C. and —90° C. At temperatures above 0° C. the initial reaction of the titanium halide with the Grignard reagent results in a substantial amount of undesirable decomposition products and the yield is thus substantially reduced. The liquid medium in which the reaction takes place should thus be chosen to give fluid mixtures which can easily be stirred at the low reaction temperatures. Ether or ether-toluene mixtures are well adapted as solvents for this purpose. After the reaction has progressed sufficiently at the selected low temperature, it may be continued at a higher temperature, preferably between about 10° C. to 40° C., whereby further reaction is promoted.

The products may be obtained with wide ranges of ratio of reactants. Ratios of cyclopentadienyl carbon ring Grignard reagent to titanium halide of between about 2:1 and 5:1 are generally preferred although ratios well outside this range may be employed.

The organo-metallic compounds of this invention may also be produced by formation of an alkali metal derivative of an organic compound containing the cyclopentadienyl carbon ring and reaction of the resulting organo-alkali metal compound with a titanium halide as disclosed and claimed in copending application Serial No. 381,970, entitled "Process for Producing Organo-metallic Compounds" and filed of even date. However, the process there disclosed and claimed forms no part of this invention.

The organo-titanium compounds of this invention are in general highly colored crystalline solids. The physical properties of the organo-titanium dihalides vary with variations in the halogen and in the organic component. The bis (cyclopentadienyl) titanium dihalides vary in physical properties according to the halogen. In color they vary from yellow for the fluoride to dark red for the bromide. The difluoride is slightly soluble in water but other dihalides are not water-soluble. In general the bis-(cyclopentadienyl) titanium dihalides are soluble in dilute acid solutions and in chloroform and in benzene. They dissolve in ethanol but there is evidence of reaction with the solvent in this case. They are not soluble in aqueous alkaline solution but on standing in aqueous sodium hydroxide or ammonium hydroxide or with slight heating they are decomposed by the alkali precipitating the titanium as titanium hydroxide. Bis(cyclopentadienyl)titanium dichloride melts at about 280° C. with decomposition and the difluoride decomposes at 230° C.–250° C. without melting. The dichloride has been found to be monomeric and diamagnetic.

Bis(methylcyclopentadienyl)titanium dichloride melts at about 223° C. and is volatile under reduced pressure of about 1 mm. of mercury at 160° C.–180° C. The bis-(alkylcyclopentadienyl)titanium dihalides are similar in properties to the bis(cyclopentadienyl)titanium dihalides but have increased volatility, lower melting points and greater solubility in organic solvents. Similar variations are found with other substituents on the cyclopentadienyl carbon ring.

The compounds of this invention may, by reason of color, be employed as coloring agents. They also have use as fuel additives since they present a means of addition of titanium in petroleum-soluble form. They may also be employed as drying accelerators for drying oils.

As illustrative embodiments of a manner in which the invention may be practiced, the following examples are presented. In each example an inert protective atmosphere of nitrogen or other inert gas was employed during formation of the Grignard reagents and their reaction with titanium halides.

Example I

The Grignard reagent of cyclopentadiene was prepared by treating 1 mol of magnesium turnings in 400 ml. ethyl ether with sufficient liquid ethyl chloride, added dropwise to react with all the magnesium and adding to resulting solution 1 mol of cyclopentadiene and 200 ml. of benzene. The benzene was added to raise the reflux temperature and the mixture was maintained at reflux for eighteen hours, until the evolution of ethane ceased. 300 ml. of the solvent were removed by distillation, 300 ml. of ethyl ether added, another 300 ml. of solvent removed by distillation, and 150 ml. of ether were added. The Grignard reagent is now in a liquid medium suitable for low temperature reaction.

The cyclopentadienyl Grignard reagent was colored to −70° C. and there was slowly added to the stirred mixture a TiCl$_4$ solution comprising 1/3 mol of TiCl$_4$ in 75 ml. benzene. The mixture was maintained at −70° C. for about twenty hours and it was then warmed to room temperature and stirred for eight hours. The reaction mixture was a bright red.

The reaction mixture was hydrolyzed by pouring it into 70 ml. of concentrated HCl in 400 ml. ice cold water and the red insoluble $(C_5H_5)_2TiCl_2$ was removed from the mixture by filtration. Additional product was obtained by chloroform extraction of the acid layer and crystallization of the product from chloroform. The red crystals of $(C_5H_5)_2TiCl_2$ can be recrystallized from chloroform or benzene.

While in this example a 3:1 mol ratio of $C_5H_5MgCl$ to TiCl$_4$ was used, ratios of 4:1 to 1:1 may also be employed.

Example II

The Grignard reagent of cyclopentadiene was prepared by slowly adding 1/4 mol of freshly distilled cyclopentadiene to 1/4 mol $C_2H_5MgBr$ in 138 ml. of a mixture of two parts benzene and one part ethyl ether by volume at 25° C. Then, the mixture was refluxed until the evolution of ethane ceased. The benzene was replaced with ethyl ether in the manner described in Example I and the ether solution of $C_5H_5MgBr$ was cooled to −70° C. and 1/16 mol of TiCl$_4$ in 100 ml. of benzene prepared under nitrogen atmosphere was slowly added over a period of thirty minutes to the stirred Grignard reagent solution and stirring 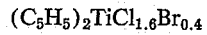 was continued while maintaining the temperature of the reaction mixture at −70° C. for about twenty hours, after which the reaction mixture was warmed to room temperature and stirred for six hours. The mixture was hydrolyzed by addition of 20 g. NH$_4$Cl and 100 ml. of concentrated HCl in 200 ml. of ice water. The acid layer was extracted twice with benzene and twice with chloroform. The solvents were removed from the extracts and the residue taken up in chloroform and crystallized to yield red transparent crystals which were found to be $$(C_5H_5)_2TiCl_{1.6}Br_{0.4}$$

The product melted at 272° C. in air.

Example III

One gram of the residue obtained from the chloroform extract in Example II was heated to boiling in a mixture of 100 ml. of distilled water and 100 ml. of concentrated HCl. The solution was filtered, the filtrate concentrated to one-half its volume and extracted three times, each time with 50 ml. of CHCl$_3$. Concentration of the combined extracts gave red crystals of $(C_5H_5)_2TiCl_2$ the bromine having been eliminated.

Example IV

The methyl derivative of bis(cyclopentadienyl) titanium dichloride may be prepared by reacting a methylcyclopentadienyl Grignard reagent with titanium tetrachloride. An alkyl Grignard reagent was prepared by treating 1.0 mol of magnesium turnings in 400 ml. of ethyl ether with 1.0 mol of ethyl bromide. When reaction with the magnesium was complete, 1.0 mol of methyl cyclopentadiene recovered from commercial dicyclopentadiene, was added dropwise and the reaction mixture refluxed for three hours giving a solution of the methyl cyclopentadienyl Grignard reagent, $CH_3C_5H_4MgBr$. This reagent, following partial replacement of ether with toluene, was cooled to about −70° C. and 0.25 mol of titanium tetrachloride in 200 ml. of toluene was added slowly. Following reaction at about −70° C., the temperature was permitted to rise to about 25° C. with further reaction taking place. The product obtained was originally green but turned red on exposure to air.

The reaction mixture was hydrolyzed over ice with dilute hydrochloric acid yielding a bright red solid with red solutions both in the acid layer and in the organic layer. The solid was removed by filtration and recrystallized from chloroform. The acid layer was extracted with chloroform from which further crystals were obtained.

Analysis of the product showed it to be $$(CH_3C_5H_4)_2TiCl_2$$

The melting point was 223° C.; the compound is volatile at a reduced pressure of about 1 mm. at a temperature of 160° C.–180° C., and its solubility characteristics are similar to those of the unsubstituted cyclopentadienyltitanium compounds.

Example V

A red dilute HCl solution of $(C_5H_5)_2TiCl_2$ was passed through a Jones reductor containing zinc. The eluted solution is green and comprises a solution of the monochloride $(C_5H_5)_2TiCl$, which on exposure to air is readily oxidized, the green solution turning the characteristic red of acid solutions of the dichloride.

Example VI

The following is an example of the preparation of compounds of this invention by the methods disclosed and claimed in the co-pending application, S.N. 381,970, entitled "Process for Producing Organo-metallic Compounds" and filed of even date. It is to be understood however that such methods of preparation form no part  of the present invention.

One mole of $C_5H_6$ is added dropwise to a stirred suspension of finely divided sodium in 500 ml. of ethylene glycol dimethyl ether, the temperature of the reaction mixture being maintained at 30° C.–40° C. A suspension of 59.5 g. of $TiCl_2$ in ethylene glycol dimethyl ether is added at room temperature to the resulting $NaC_5H_5$ slurry. A slightly exothermic reaction immediately occurred to give a dark green mixture which was filtered.

The clear filtrate was evaporated to dryness in vacuum. By fractional sublimation, a homogeneous dark green deposit $(C_5H_5)_2Ti$ is obtained at a temperature of 150° C. and about 1 mm. Hg. The compound is very unstable in air.

The $(C_5H_5)_2Ti$ in benzene solution when treated with anhydrous HBr undergoes rapid reaction to give a red solution from which red crystals of $(C_5H_5)_2TiBr_2$ can be crystallized.

*Example VII*

The following procedure was carried out in air. 20 grams of bis(cyclopentadienyl)titanium dichloride was dissolved in 400 ml. distilled water, 50 ml. of 48% hydrofluoric acid, and 200 ml. ethylene glycol dimethyl ether. This solution was warmed on the steam bath for one hour. After filtering, the solution cooled in an ice bath yielded yellow needles which were removed from the mixture by filtration and recrystallized from a 1:1 mixture by volume of benzene and chloroform. The yellow crystalline product was $(C_5H_5)_2TiF_2$, bis(cyclopentadienyl)titanium difluoride. The aqueous layer was extracted with chloroform and the chloroform solution evaporated to give an additional amount of $(C_5H_5)_2TiF_2$. Bis(cyclopentadienyl)titanium difluoride decomposes above 250° C. without melting.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A compound of the formula $$R_2TiX_2$$

wherein R is a cyclopentadienyl radical and X is a halogen.

2. An organo-metallic compound having the empirical formula:

$$(C_5H_5)_2TiCl_2$$

3. An organo-metallic compound having the empirical formula:

$$(CH_3C_5H_4)_2TiCl_2$$

4. An organo-titanium compound having the empirical formula:

$$(C_5H_5)_2Ti$$

5. An organo-titanium compound having the empirical formula:

$$(C_5H_5)_2TiBr_2$$

6. An organo-titanium compound having the empirical formula:

$$(C_5H_5)_2TiF_2$$

7. An organo-titanium compound having the empirical formula $$R_2TiX_{(y)}X'_{(z)}$$

wherein R is a member of the group consisting of cyclopentadienyl, indenyl, and lower alkyl- and lower alkenyl-substituted derivatives thereof and benzylcyclopentadienyl, X and X' are different halogens and $(y)$ an $(z)$ are numbers which total 2.

8. An organo-metallic composition having the apparent average empirical formula:

$$(C_5H_5)_2TiX_{(y)}X'_{(z)}$$

where X and X' are different halogens and $(y)$ and $(z)$ are numbers which total 2.

9. An organo-metallic composition having the apparent average empirical formula:

$$(CH_3C_5H_4)_2TiX_{(y)}X'_{(z)}$$

where X and X' are different halogens and $(y)$ and $(z)$ are numbers which total 2.

10. An organo-metallic composition having the apparent average empirical formula:

$$(C_5H_5)_2TiCl_{(y)}Br_{(z)}$$

wherein $(y)$ and $(z)$ are numbers which total 2.

11. An organo-metallic composition having the apparent average empirical formula:

$$(CH_3C_5H_4)_2TiCl_{(y)}Br_{(z)}$$

wherein $(y)$ and $(z)$ are numbers which total 2.

12. A process for the preparation of organo-titanium halides which comprises reacting a titanium halide with a reagent having the general formula $$RMgX$$

wherein R is a member of the group consisting of cyclopentadienyl, indenyl, and lower alkyl- and lower alkenyl-substituted derivatives thereof and benzylcyclopentadienyl, and X is halogen.

13. A process for the preparation of organo-titanium halides which comprises reacting a titanium halide with a reagent having the general formula $$RMgX$$

wherein R is a member of the group consisting of cyclopentadienyl, indenyl, and lower alkyl- and lower alkenyl-substituted derivatives thereof and benzylcyclopentadienyl, and X is halogen, in a liquid medium under an inert atmosphere at a temperature between about 0° C. and −90° C., thereafter warming the reaction mixture to at least 10° C. and allowing the reaction to proceed further at said higher temperature.

14. A process for the preparation of bis(cyclopentadienyl)titanium dichloride which comprises reacting titanium tetrachloride with cyclopentadienyl magnesium chloride at a temperature between about 0° C. and −90° C., warming the reaction mixture to at least 10° C., allowing the reaction to proceed further at said higher temperature and recovering the bis(cyclopentadienyl)titanium dichloride.

15. A process for preparation of bis(cyclopentadienyl)-titanium dihalide having the average general formula $(C_5H_5)_2TiCl_{(y)}Br_{(z)}$, where $(y)$ and $(z)$ are numbers which total 2, which comprises reacting titanium tetrachloride with $C_5H_5MgBr$.

References Cited in the file of this patent

UNITED STATES PATENTS 2,818,416    Brown et al. _____ Dec. 31, 1957
2,864,843    De Witt et al. _____ Dec. 16, 1958

OTHER REFERENCES

Kealy et al.: Nature, volume 168m, pp. 1039–1040, December 15, 1951.

Wilkinson: Journal American Chemical Society, 74, Dec. 5, 1952, p. 2593.

Wilkinson et al.: Journal American Chemical Society, vol. 75, February 20, 1953, pp. 1011–1012.

Herman et al.: Journal American Chemical Society, vol. 75, pp. 3882–3887, August 20, 1953.